US010203850B2

(12) United States Patent
Ishikuro

(10) Patent No.: US 10,203,850 B2
(45) Date of Patent: Feb. 12, 2019

(54) DATA EDITING APPARATUS, DATA EDITING METHOD, AND DATA EDITING PROGRAM

(71) Applicant: Mitsubishi Electric Corporation, Tokyo (JP)

(72) Inventor: Toru Ishikuro, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 0 days.

(21) Appl. No.: 15/542,851

(22) PCT Filed: Feb. 27, 2015

(86) PCT No.: PCT/JP2015/055824
§ 371 (c)(1),
(2) Date: Jul. 11, 2017

(87) PCT Pub. No.: WO2016/135943
PCT Pub. Date: Sep. 1, 2016

(65) Prior Publication Data
US 2017/0364223 A1 Dec. 21, 2017

(51) Int. Cl.
G06F 17/30 (2006.01)
G06F 3/0484 (2013.01)
(Continued)

(52) U.S. Cl.
CPC ......... G06F 3/0484 (2013.01); G05B 19/042 (2013.01); G06F 3/048 (2013.01);
(Continued)

(58) Field of Classification Search
CPC ......... G06F 17/30277; G06F 17/30551; G06F 17/30064; G06F 17/3056; G06F 17/30864;
(Continued)

(56) References Cited

U.S. PATENT DOCUMENTS 5,477,337 A * 12/1995 Schuler ............... G11B 27/028
386/278
5,717,784 A * 2/1998 Yanagishita ......... G06K 9/4638
382/176
(Continued)

FOREIGN PATENT DOCUMENTS

JP 10-083206 A 3/1998
JP 2006-302216 A 11/2006
(Continued)

OTHER PUBLICATIONS

Decision to Grant a Patent of Japanese Patent Application No. 2017-501789, dated Mar. 14, 2017.
(Continued)

Primary Examiner — Ashish Thomas
Assistant Examiner — Rezwanul Mahmood
(74) Attorney, Agent, or Firm — Sughrue Mion, PLLC; Richard C. Turner

(57) ABSTRACT

A data editing apparatus has: a storage unit which stores first and second project data; a temporary screen data creating unit which creates temporary screen data based on screen data selected from among a first group of screen data; a temporary label list creating unit which creates a temporary label list including a label written in the temporary screen data; a temporary data changing unit which replaces the label written in the temporary screen data and the temporary label list with a label which does not overlap with the label written in a second label list, when the label written in the temporary screen data and the temporary label list is written in the second label list; and a project data adding unit which adds allocation information written in the changed temporary screen data and temporary label list to the second label list.

7 Claims, 12 Drawing Sheets

(51) Int. Cl.
*G05B 19/042* (2006.01)
*G06F 3/048* (2013.01)
*G06F 3/0482* (2013.01)
*G06F 3/147* (2006.01)
*G06F 17/22* (2006.01)

(52) U.S. Cl.
CPC ............ *G06F 3/0482* (2013.01); *G06F 3/147* (2013.01); *G06F 17/30277* (2013.01); *G05B 2219/13004* (2013.01); *G06F 17/2247* (2013.01)

(58) Field of Classification Search
CPC ......... G06F 17/30126; G06F 17/30309; G06F 17/30371; G06F 17/30958; G06F 17/3089; G06F 17/30106; G06F 17/30067; G06F 17/30289; G06F 17/30303; G06F 17/30693; G06F 17/30722; G06F 17/30979
See application file for complete search history.

(56) References Cited

U.S. PATENT DOCUMENTS

| | | | | |
|---|---|---|---|---|
| 5,835,629 | A * | 11/1998 | Seo ...................... | G06K 9/4638 382/173 |
| 5,864,711 | A * | 1/1999 | Mairs .................... | G06F 3/1462 345/522 |
| 7,275,236 | B1 * | 9/2007 | Kabe .................... | G05B 19/056 717/106 |
| 7,603,183 | B1 * | 10/2009 | Munemoto ............ | G05B 19/05 700/17 |
| 7,797,210 | B2 * | 9/2010 | Eichhorn ............... | G06Q 10/00 705/35 |
| 8,341,078 | B2 * | 12/2012 | Allin ..................... | G06Q 10/06 705/39 |
| 8,499,277 | B2 * | 7/2013 | Tone .................... | G05B 19/052 717/100 |
| 9,733,902 | B2 * | 8/2017 | Northrup ................ | G06F 8/34 |
| 9,811,071 | B2 * | 11/2017 | Nagao ................... | G05B 19/05 |
| 2003/0236775 | A1 * | 12/2003 | Patterson ............. | G06F 11/368 707/999.003 |
| 2004/0117434 | A1 * | 6/2004 | Bantz .................... | H04L 67/104 709/201 |
| 2006/0097956 | A1 * | 5/2006 | Ogawa ................... | H04L 67/36 345/2.1 |
| 2006/0098174 | A1 * | 5/2006 | Ohuchi ................. | H04M 3/567 353/122 |
| 2006/0180659 | A1 * | 8/2006 | Loffredo ............... | G06F 3/1205 235/380 |
| 2006/0253499 | A1 * | 11/2006 | Zhao ................. | G06F 17/30563 707/999.2 |
| 2009/0048870 | A1 * | 2/2009 | Godshall ............... | G16H 10/40 705/3 |
| 2009/0235173 | A1 * | 9/2009 | Ichihara ............. | H04N 1/00222 715/733 |
| 2009/0276059 | A1 * | 11/2009 | Tone .................... | G05B 19/052 700/7 |
| 2009/0302106 | A1 * | 12/2009 | Satou ................... | G06Q 20/203 235/383 |
| 2011/0110591 | A1 * | 5/2011 | Sheu ........................ | G06T 7/11 382/180 |
| 2012/0290775 | A1 * | 11/2012 | Ichioka ................ | G05B 19/056 711/103 |
| 2013/0051675 | A1 * | 2/2013 | Sheu .................... | G06T 7/0081 382/180 |
| 2014/0304253 | A1 * | 10/2014 | Hanaki .............. | G05B 23/0272 707/722 |
| 2015/0220076 | A1 * | 8/2015 | Uchida .................. | G05B 19/05 700/97 |
| 2015/0264129 | A1 * | 9/2015 | Takeuchi ............ | H04L 67/1044 709/205 |
| 2015/0277413 | A1 * | 10/2015 | Nagao ................... | G05B 19/05 700/86 |
| 2015/0288936 | A1 * | 10/2015 | Jakubiak ................ | H04N 9/317 353/101 |
| 2016/0004239 | A1 * | 1/2016 | Furushima .......... | G05B 19/042 700/83 |
| 2017/0083349 | A1 * | 3/2017 | Iwaki .................... | G05B 19/05 |
| 2017/0364223 | A1 * | 12/2017 | Ishikuro ............ | G05B 19/042 |

FOREIGN PATENT DOCUMENTS

| | | |
|---|---|---|
| JP | 2007-265252 A | 10/2007 |
| JP | 2008-059532 A | 3/2008 |
| JP | 2008-276526 A | 11/2008 |
| JP | 2009-104227 A | 5/2009 |
| JP | 2012-108568 A | 6/2012 |
| JP | 2014-137794 A | 7/2014 |
| WO | 2011/089688 A1 | 7/2011 |

OTHER PUBLICATIONS

International Search Report of PCT/JP2015/055824, dated May 19, 2015. [PCT/ISA/210].

Written Opinion of PCT/JP2015/055824, dated May 19, 2015. [PCT/ISA/237].

Communication dated Mar. 23, 2018, issued by the German Patent Office in counterpart German Application No. 112015005924.5.

* cited by examiner

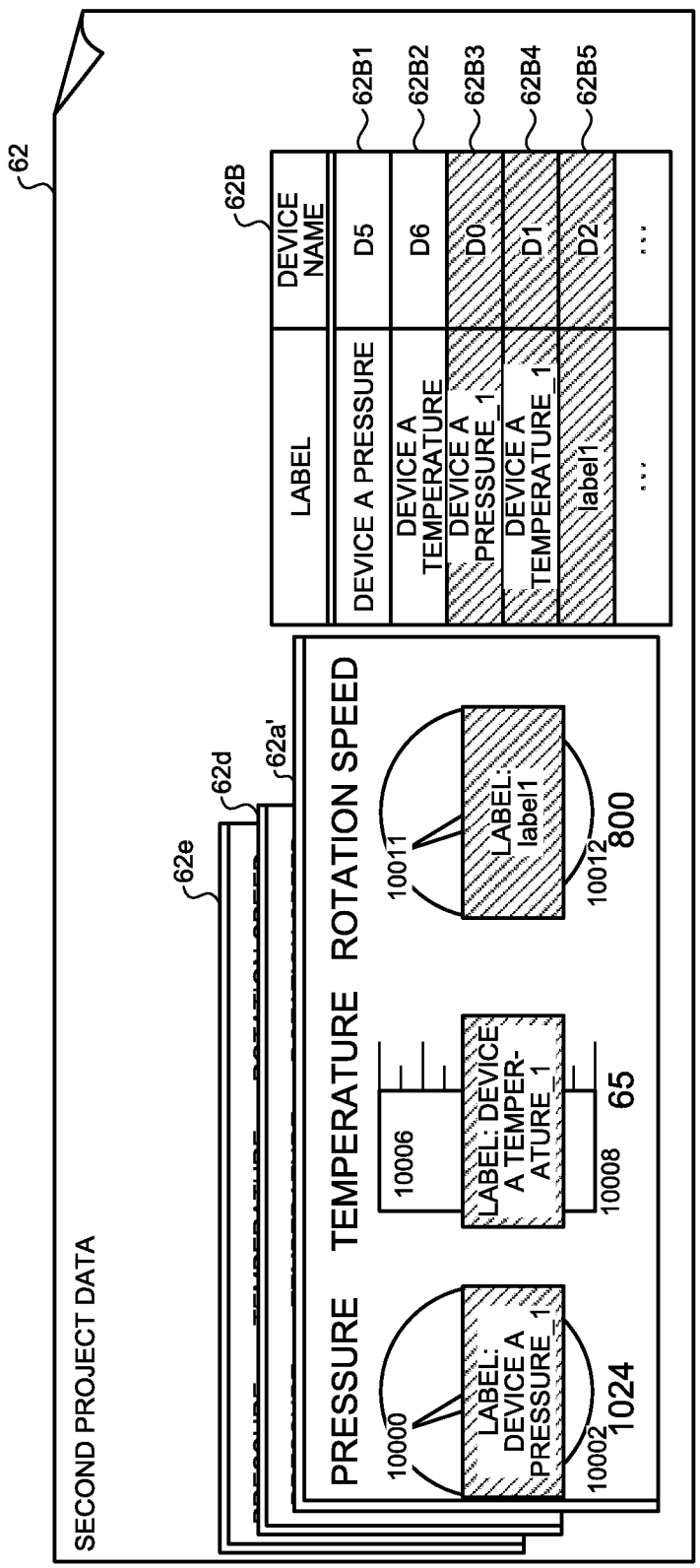

DATA EDITING APPARATUS, DATA EDITING METHOD, AND DATA EDITING PROGRAM

CROSS REFERENCE TO RELATED APPLICATIONS

This application is a National Stage of International Application No. PCT/JP2015/055824 filed Feb. 27, 2015, the contents of all of which are incorporated herein by reference in their entirety.

FIELD

The present invention relates to a data editing apparatus, a data editing method, and a data editing program, that edit data for displaying a screen.

BACKGROUND

A programmable controller (JIS B 3502: 2011 programmable controllers (PLCs)) is used to control operations of industrial machines. A programmable display (JIS B 3551: 2012, programmable display) is used to monitor data in the PLC by an operator.

The programmable display can store a number of pieces of screen data created by a personal computer, and can switch and display a number of screens.

In each screen data piece, a label or device name for uniquely specifying a memory area in the PLC to be monitored, and a label or device name for uniquely specifying a memory area in the PLC to be a transfer destination of data inputted to each screen are written. As a result, the data to be monitored is displayed in each screen, and the data inputted in each screen is transferred to the PLC. A user of the personal computer can determine the label. The user of the personal computer can easily determine which kind of data in the PLC is monitored and to which part of the PLC the data are transferred, by writing the memory area in the PLC to be monitored and the memory area in the PLC to be the transfer destination of the data as labels.

When requesting the data to be monitored to the PLC and when transferring the input data to the PLC, it is necessary for the programmable display to designate the device name for uniquely specifying each memory area in the PLC for the PLC. The device name is a name which is systematically allocated to each memory area by a vendor of the PLC. Therefore, it is necessary for the personal computer to store a label list in which labels are respectively associated with the device names and to convert a label written in each screen data piece into a device name.

A combination of a single or a plurality of pieces of screen data and the label list is referred to as project data. The screen data are managed with the project data being used as a unit.

It has been desired to divert certain screen data in project data created to monitor a combination of one industrial machine and a PLC to other project data to monitor a combination of another industrial machine and another PLC. This is because if screen data can be diverted, it is possible to improve efficiency of creating the project data and reduce man-hours.

CITATION LIST

Patent Literature

Patent Literature 1: Japanese Patent Application Laid-Open No. 2006-302216

Patent Literature 2: Japanese Patent Application Laid-Open No. 2012-108568

Patent Literature 3: Japanese Patent Application Laid-Open No. H10-083206

SUMMARY

Technical Problem

However, if the screen data in the project data of the diversion source is simply copied into the project data of the diversion destination, there is a problem that wrong data are displayed in the diverted screen data in a case where a label identical to the label used in the screen data of the diversion source has been already used in the project data of the diversion destination. Therefore, it is not easy to divert screen data in certain project data to the other project data.

Patent Literature 1 discloses a technique for converting address unresolved screen data that are screen data having a variable which is not associated with a memory address in the PLC into address solved screen data that are screen data having a variable which is associated with the memory address in the PLC, based on variable allocation information read from the PLC (Paragraph 0008). However, Patent Literature 1 does not disclose the diversion of certain screen data to other screen data.

Patent Literature 2 discloses storing label-device data $D_{LD}$ in which a label is associated with a device (Paragraph 0023). Further, Patent Literature 2 discloses that a label list that is a list of set labels is displayed at the time of editing a control program CP (Paragraph 0029). Also, Patent Literature 2 discloses a technique for extracting a label for the other device that is a label of a device connected to the other PLC from among labels in a control program for each control program of each PLC, classifying the extracted label for the other device in PLCs, and creating label list information for the other device (Paragraph 0059). However, Patent Literature 2 does not disclose diversion of a certain control program to another control program.

Patent Literature 3 discloses a sequence program creating device including: program searching means for searching for a device used in a sequence program; table device searching means for searching a specified label-device table for the device obtained by the program searching means; label obtaining means for obtaining a label associated with the device from the label-device table; and program modifying means for replacing the device of the sequence program with the label (claim 4). However, Patent Literature 3 does not disclose diversion of a certain sequence program to another sequence program.

The present invention has been made in consideration of the above. An object of the present invention is to provide a data editing apparatus which can easily divert screen data in certain project data to other project data.

Solution to Problem

The present invention includes a storage unit to store first project data including: a first group of screen data; and a first label list having allocation information for associating a label and a device name written in the first group of screen data with each other written therein, and second project data including: a second group of screen data; and a second label list having allocation information for associating a label and a device name written in the second group of screen data with each other written therein.

The present invention further includes: a temporary screen data creating unit to create temporary screen data based on screen data selected from among the first group of screen data; a temporary label list creating unit to create a temporary label list based on allocation information in the first label list including a label written in the temporary screen data; a temporary data changing unit to replace a label written in the temporary screen data and the temporary label list with a label that does not overlap with the label written in the second label list, when a label written in the temporary screen data and the temporary label list is written in the second label list; and a project data adding unit to add the changed temporary screen data to the second project data, and to add the allocation information written in the changed temporary label list to the second label list.

Advantageous Effects of Invention

According to the present invention, an effect can be obtained that screen data in certain project data can be easily diverted to other project data.

BRIEF DESCRIPTION OF DRAWINGS

FIG. 14 is a diagram illustrating the second project data according to the first embodiment.

DESCRIPTION OF EMBODIMENTS

A data editing apparatus, a data editing method, and a data editing program according to an embodiment of the present invention are described in detail below with reference to the drawings. The present invention is not limited to this embodiment.

First Embodiment

Figure 1:
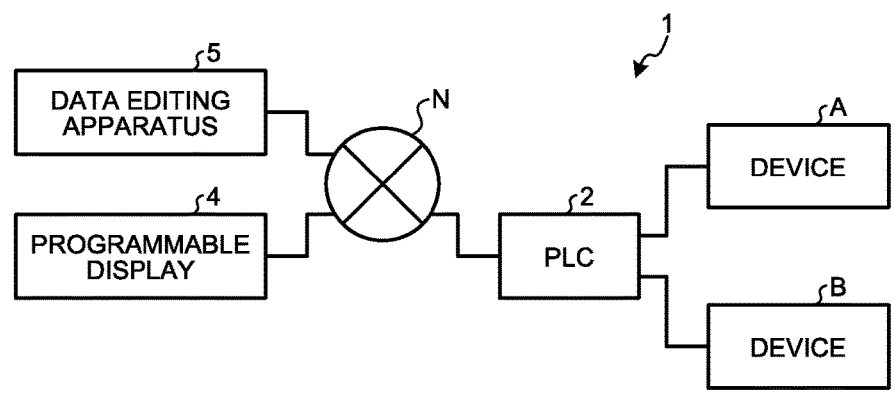
FIG. 1 is a diagram illustrating a configuration of a control system including a data editing apparatus according to a first embodiment.

FIG. 1 is a diagram illustrating a configuration of a control system including a data editing apparatus according to a first embodiment. A control system 1 includes a PLC 2, a programmable display 4, a data editing apparatus 5, and devices A and B. The PLC 2, the programmable display 4, and the data editing apparatus 5 are communicably connected to each other via a network N. The PLC 2 is connected to the devices A and B exemplified by industrial machines and controls operations of the devices A and B.

The programmable display 4 and the data editing apparatus 5 may be directly connected to each other, not via the network N. A unit for directly connecting the programmable display 4 to the data editing apparatus 5 is exemplified by a USB (universal serial bus).

Figure 2:
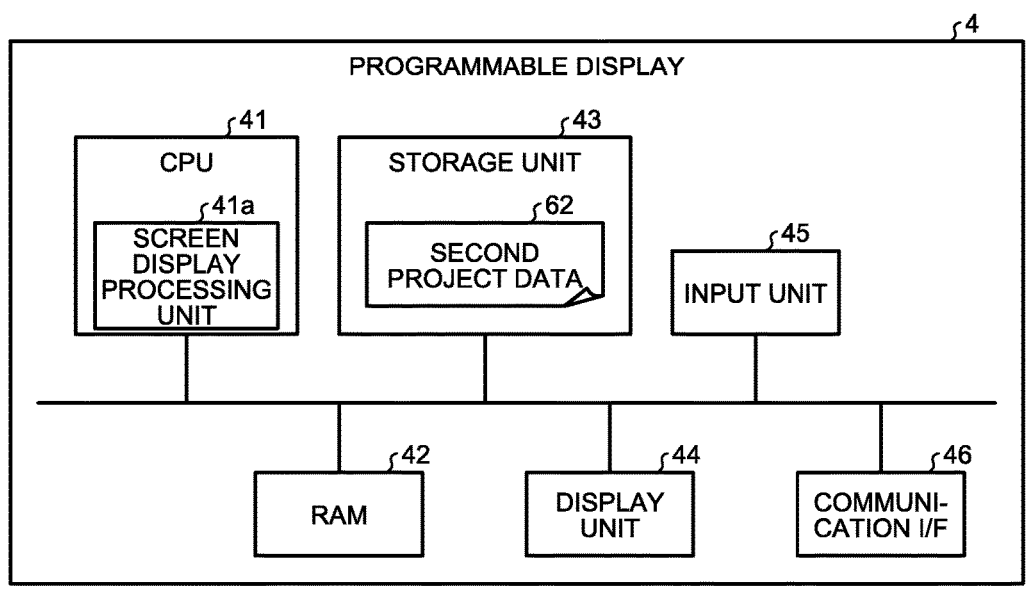
FIG. 2 is a diagram illustrating a hardware configuration of a programmable display according to the first embodiment.

FIG. 2 is a diagram illustrating a hardware configuration of a programmable display according to the first embodiment. The programmable display 4 includes a CPU (central processing unit) 41, a RAM (random access memory) 42, a storage unit 43, a display unit 44, an input unit 45, and a communication interface 46.

The CPU 41 executes a screen display processing program stored in the storage unit 43 while using the RAM 42 as a work area. Accordingly, a screen display processing unit 41a is realized. The storage unit 43 stores second project data 62 edited and transferred by the data editing apparatus 5. The second project data 62 include a second group of screen data and a second label list. The second project data 62 are described in detail later.

The display unit 44 displays characters and images. The input unit 45 receives an input from an operator. The communication interface 46 communicates with other devices.

The programmable display 4 can switch and display a number of screens based on the second group of screen data of the second project data 62. In each screen data piece, a label which uniquely specifies a memory area in the PLC 2 to be monitored by referring to each screen is written. As a result, data to be monitored is displayed in each screen. A user of the programmable display 4 can determine the label. The user of the programmable display 4 can easily determine which kind of data of the PLC 2 is monitored by writing a memory area in the PLC 2 to be monitored, using a label.

When requesting data to be monitored to the PLC 2 or when transmitting data to the PLC 2, it is necessary for the programmable display 4 to request or transmit the data to the PLC 2 using a device name which uniquely specifies each memory area in the PLC 2. The device name is a name that is systematically allocated to each memory area by a vendor of the PLC 2. Accordingly, the second project data 62 include the label list in which the labels and the device names are associated with each other, and are configured to convert the label written in each screen data piece into the device name.

Figure 3:
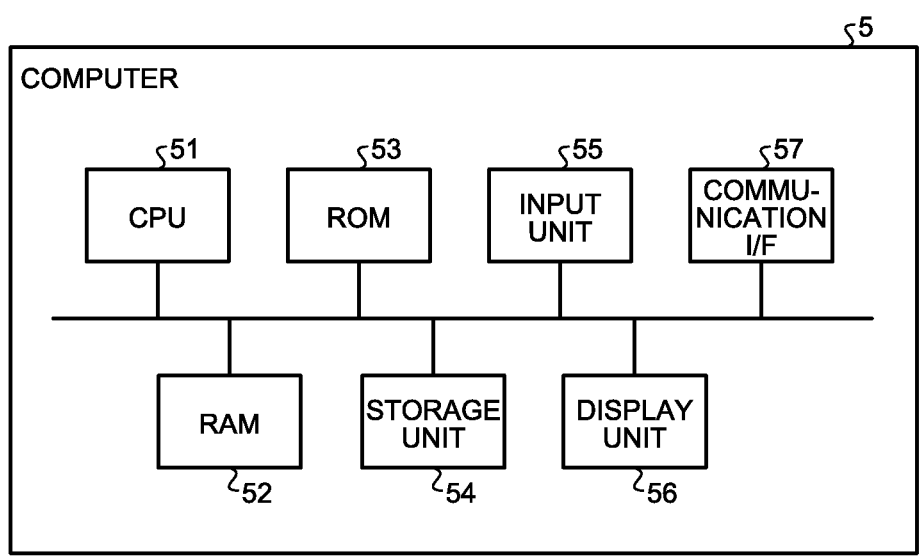
FIG. 3 is a diagram illustrating a hardware configuration of the data editing apparatus according to the first embodiment.

FIG. 3 is a diagram illustrating a hardware configuration of the data editing apparatus according to the first embodiment. The data editing apparatus 5 according to the first embodiment is a computer. The data editing apparatus 5 includes a CPU 51, a RAM 52, a ROM (read only memory) 53, a storage unit 54, an input unit 55, a display unit 56, and a communication interface 57.

The CPU 51 executes programs stored in the ROM 53 and the storage unit 54 while using the RAM 52 as a work area. The program stored in the ROM 53 is exemplified by a BIOS (basic input/output system) or UEFI (unified extensible firmware interface). The program stored in the storage unit 54 is exemplified by an operating system program and a data editing program. The storage unit 54 is exemplified by an SSD (solid state drive) or an HDD (hard disk drive).

The input unit 55 receives an operation input from an operator. The input unit 55 is exemplified by a keyboard or a mouse. The display unit 56 displays characters and images. The display unit 56 is exemplified by a liquid crystal display. The communication interface 57 communicates with other devices.

Figure 4:
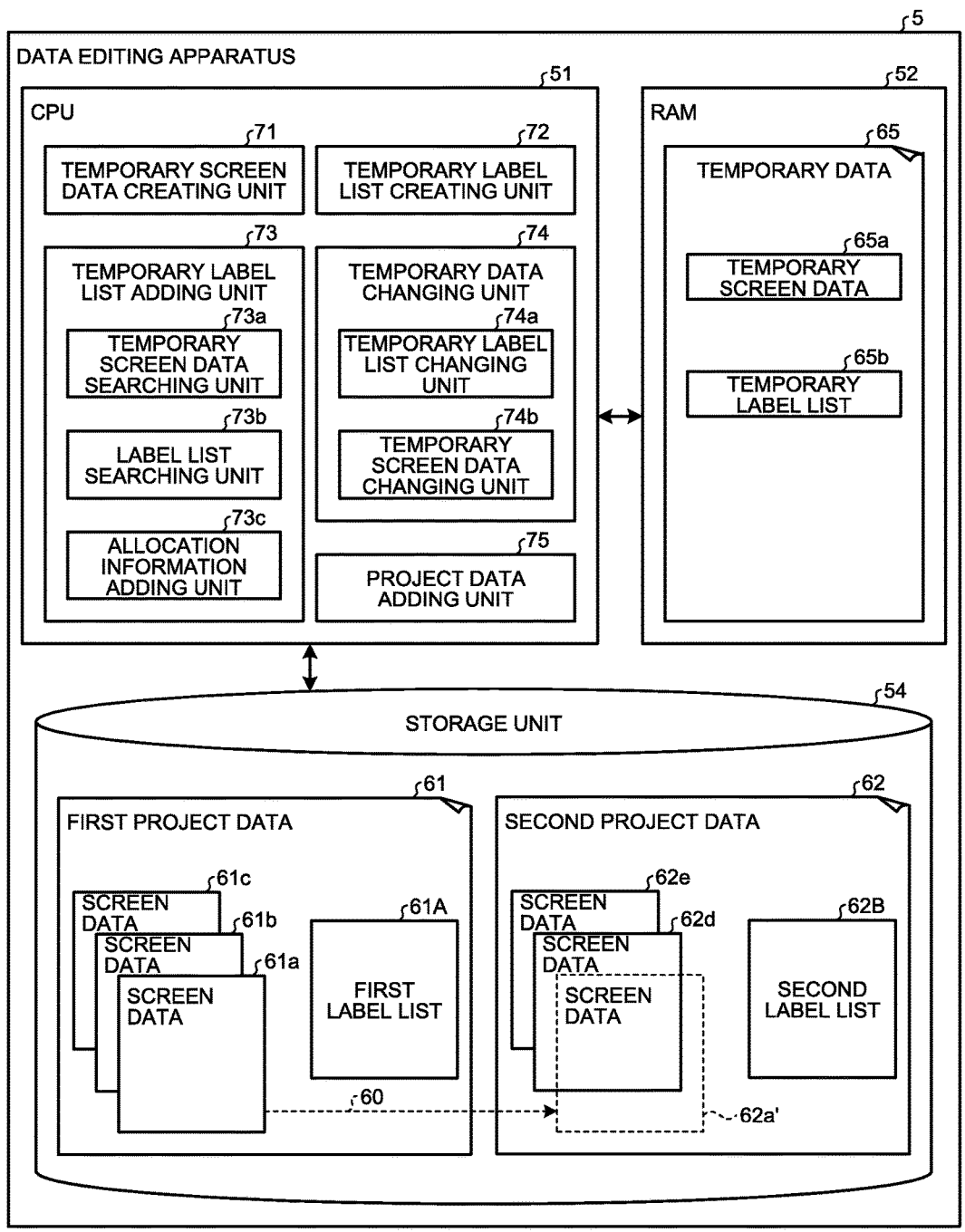
FIG. 4 is a functional block diagram of the data editing apparatus according to the first embodiment.

FIG. 4 is a functional block diagram of the data editing apparatus according to the first embodiment. The storage unit 54 stores first project data 61 including a first group of screen data 61a, 61b, and 61c, and a first label list 61A in which allocation information is written, the allocation information being intended to associate labels and device names written in the first group of screen data 61a, 61b, and 61c with each other.

Also, the storage unit 54 stores the second project data 62 including a second group of screen data 62d and 62e, and a second label list 62B in which allocation information is written, the allocation information being intended to associate labels and device names written in the second group of screen data 62d and 62e with each other.

Each of the first group of screen data pieces 61a, 61b and 61c and the second group of screen data pieces 62d and 62e is exemplified by text data written in a description language. The description language is exemplified by an HTML (hypertext markup language). The first label list 61A and the second label list 62B are exemplified by text data or a CSV (comma-separated values) data.

Figure 5:
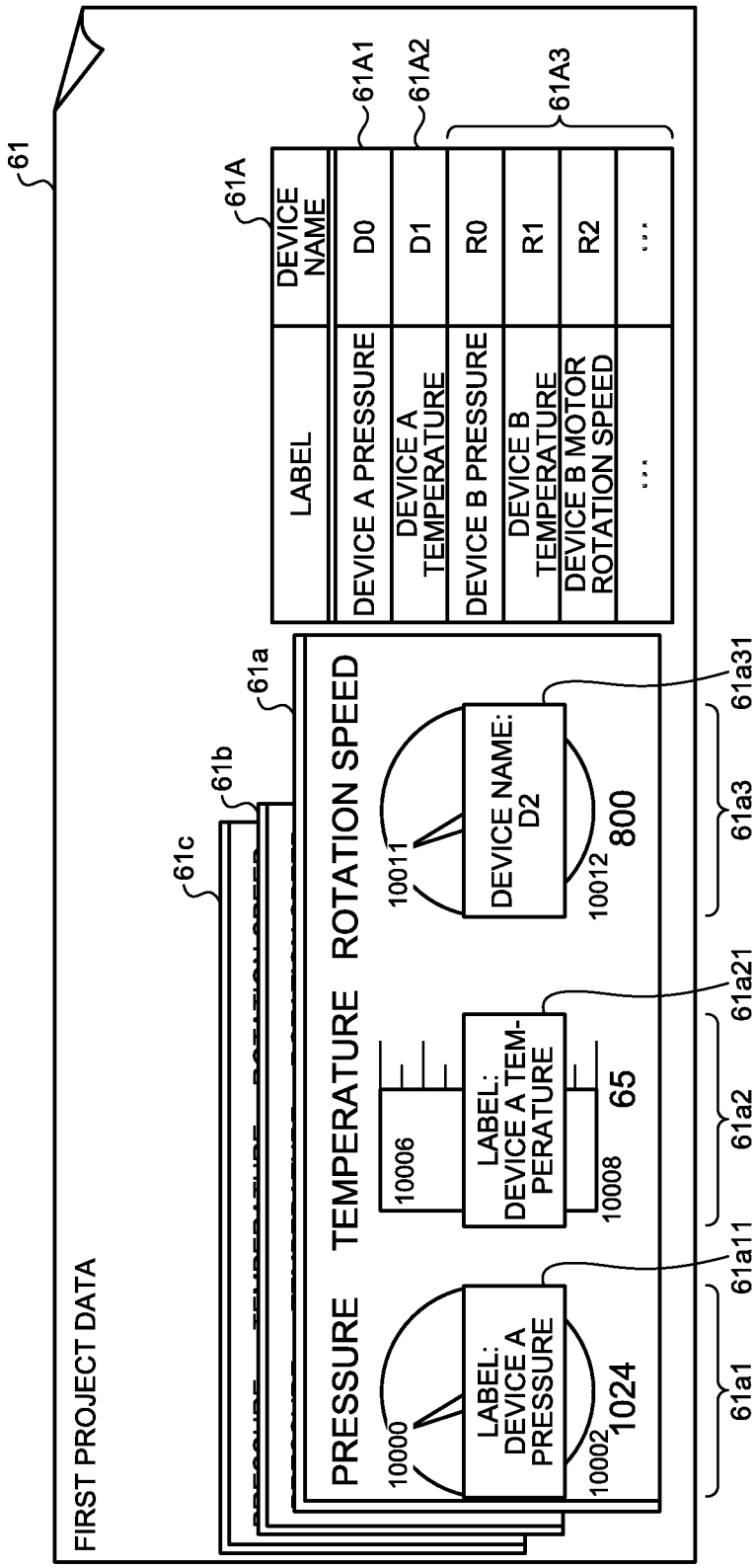
FIG. 5 is a diagram illustrating first project data according to the first embodiment.

FIG. 5 is a diagram illustrating the first project data according to the first embodiment. The first project data 61 include a first group of screen data 61a, 61b, and 61c, and the first label list 61A. For easy understanding, the first group of screen data 61a, 61b, and 61c are represented herein by images displayed using the description language, not by the description language itself.

The screen data 61a includes a first region 61a1, a second region 61a2, and a third region 61a3. The first region 61a1 is a region for displaying a pressure of the device A. In a description region 61a11 in the first region 61a1, a label "device A pressure" is written.

The second region 61a2 is a region for displaying a temperature of the device A. In a description region 61a21 in the second region 61a2, a label "device A temperature" is written.

The third region 61a3 is a region for displaying a rotation number of the device A. In a description region 61a31 in the third region 61a3, a device name "D2" is written. If the first project data 61 have been made in recent years, it can be considered that a data reference destination is not written using the device name, but is often written only using the label. However, if the first project data 61 are old, the data reference destination may be written using the device name. In the first embodiment, as described in detail below, even when the device name is written in the screen data to be diverted, the device name can be replaced with a label. Accordingly, readability of the diverted screen data can be improved.

The first label list 61A includes an item of a label and an item of a device name. In the item of a label on a first row 61A1 of the first label list 61A, "device A pressure" is written. In the item of a device name on the first row 61A1, "D0" is written. That is, the first row 61A1 is allocation information for associating the label "device A pressure" with the device name "D0".

In the item of a label on a second row 61A2 of the first label list 61A, "device A temperature" is written. In the item of a device name on the second row 61A2, "D1" is written. That is, the second row 61A2 is allocation information for allocating the label "device A temperature" with the device name "D1".

A number of rows 61A3 on and after a third row of the first label list 61A relates to labels written in the screen data 61b or 61c.

Figure 6:
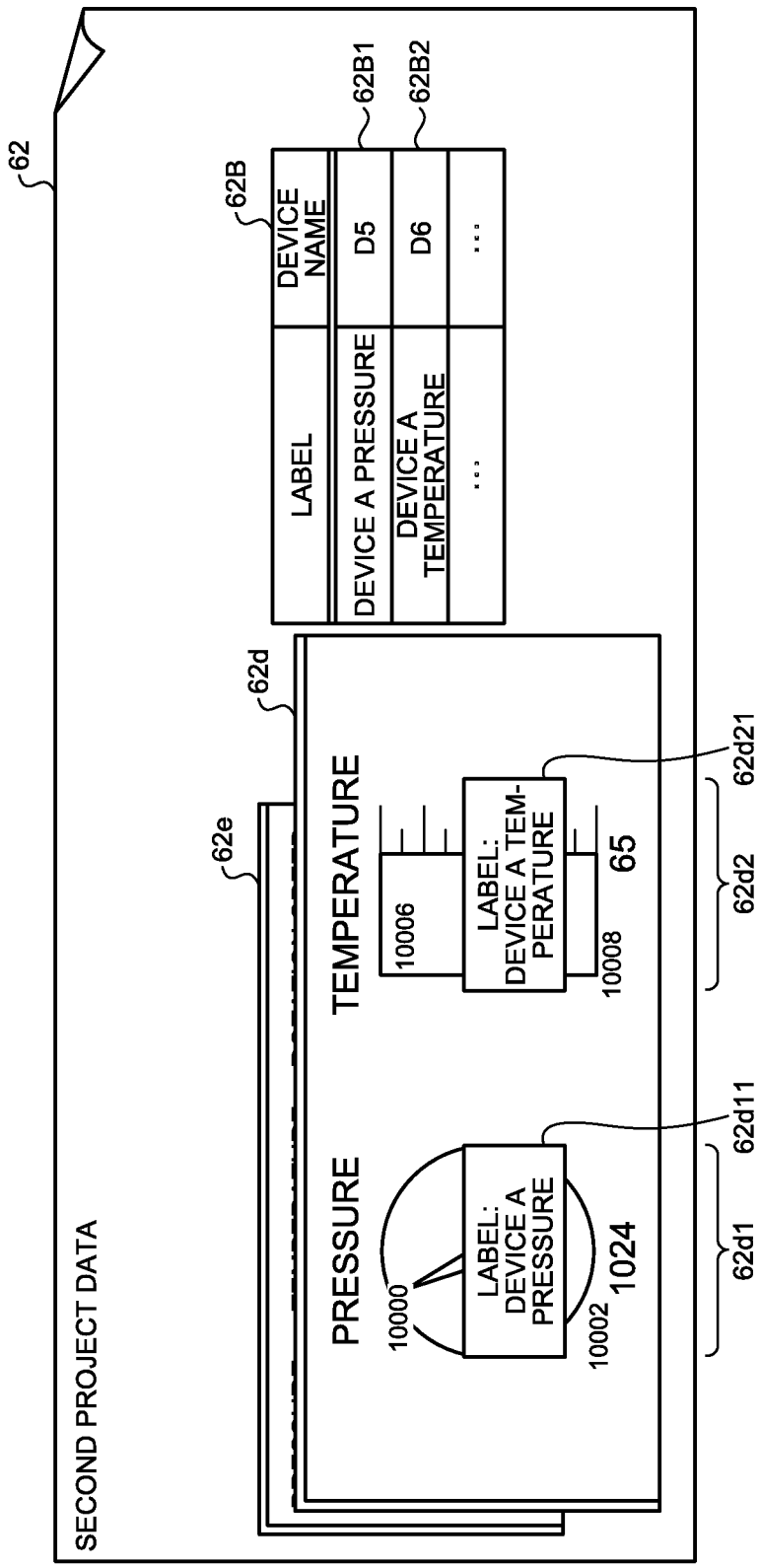
FIG. 6 is a diagram illustrating second project data according to the first embodiment.

FIG. 6 is a diagram illustrating the second project data according to the first embodiment. The second project data 62 include a second group of screen data 62d and 62e, and the second label list 62B. For easy understanding, the screen data 62d are represented herein by images displayed using the description language, not by the description language itself.

The screen data 62d include a first region 62d1 and a second region 62d2. The first region 62d1 is a region for displaying a pressure of the device A. In a description region 62d11 in the first region 62d1, a label "device A pressure" is written.

The second region 62d2 is a region for displaying a temperature of the device A. In a description region 62d21 in the second region 62d2, a label "device A temperature" is written.

The second label list 62B includes an item of a label and an item of a device name. In the item of a label on a first row 62B1 of the second label list 62B, "device A pressure" is written. In the item of a device name on the first row 62B1, "D5" is written. That is, the first row 62B1 is allocation information for associating the label "device A pressure" with the device name "D5".

In the item of a label on a second row 62B2 of the second label list 62B, "device A temperature" is written. In the item of a device name on the second row 62B2, "D6" is written. That is, the second row 62B2 is allocation information for associating the label "device A temperature" with the device name "D6".

Referring again to FIG. 4, the CPU 51 executes the data editing program stored in the storage unit 54. By doing so, it is possible to realize configurations for: a temporary screen data creating unit 71 creating the temporary screen data 65a in the RAM 52 based on the screen data selected from among the first group of screen data 61a, 61b, and 61c; a temporary label list creating unit 72 creating a temporary label list 65b in the RAM 52 based on the allocation information in the first label list 61A including a label written in the temporary screen data 65a; a temporary label list adding unit 73 creating allocation information including a label or a device name which has not been written in the temporary label list 65b and adding the allocation information to the temporary label list 65b, when the label or device name written in the temporary screen data 65a is not written in the temporary label list 65b; a temporary data changing unit 74 replacing the label written in the temporary screen data 65a and the temporary label list 65b with a label which does not overlap with the label written in the second label list 62B, when the label written in the temporary screen data 65a and the temporary label list 65b is written in the second label list 62B; and a project data adding unit 75 adding the changed temporary screen data 65a to the second project data 62 and adding the allocation information written in the changed temporary label list 65b to the second label list 62B.

The temporary label list adding unit 73 includes: a temporary screen data searching unit 73a searching and extracting a label written in the temporary screen data 65a; a label list searching unit 73b searching the first label list 61A using the label extracted by the temporary screen data searching unit 73a; and an allocation information adding unit 73c creating allocation information indicating that the device name is not associated with the label extracted by the temporary screen data searching unit 73a and adding the allocation information to the temporary label list 65b, when the allocation information including the label extracted by the temporary screen data searching unit 73a is not written in the first label list 61A.

The temporary data changing unit 74 includes a temporary label list changing unit 74a and a temporary screen data changing unit 74b. The temporary label list changing unit 74a replaces the label written in the temporary label list 65b with a label which does not overlap with the label written in the second label list 62B, when the label written in the temporary label list 65b is written in the second label list 62B. The temporary screen data changing unit 74b replaces the label to be changed by the temporary label list changing unit 74a with the label changed by the temporary label list changing unit 74a in the temporary screen data 65a.

In the first embodiment, description is given as an example for a case where screen data 62a' obtained by diverting the screen data 61a in the first project data 61 are added to the second project data 62 as shown by an arrow 60.

Figure 7:
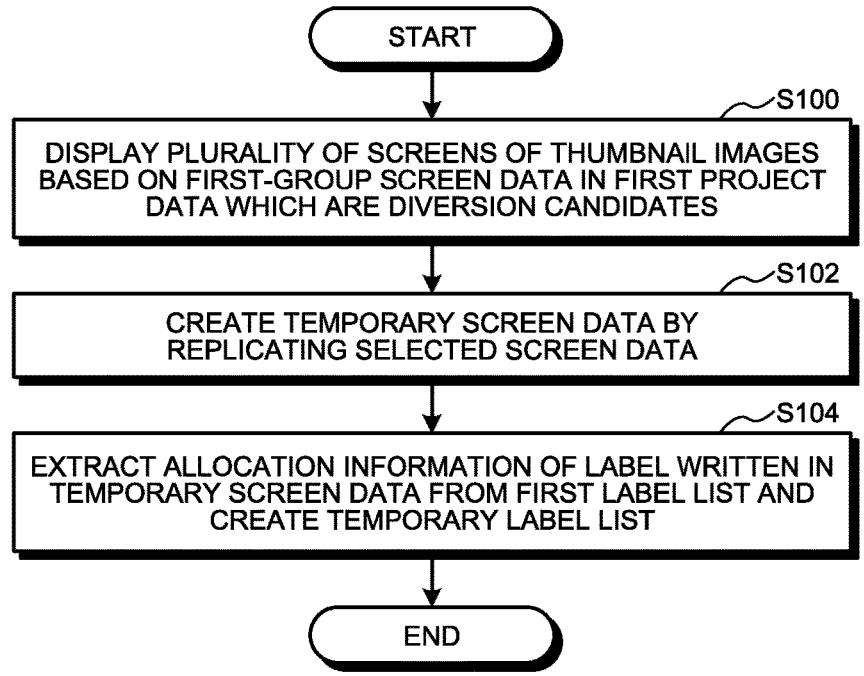
FIG. 7 is a flowchart illustrating temporary data creating processing of the data editing apparatus according to the first embodiment.

First, an operation of the data editing apparatus 5 is described. FIG. 7 is a flowchart illustrating temporary data creating processing of the data editing apparatus according to the first embodiment.

In step S100, the temporary screen data creating unit 71 displays thumbnail images of a plurality of screens, which are based on the first group of screen data 61a, 61b and 61c in the first project data 61, that are diversion candidates, on the display unit 56.

Figure 8:
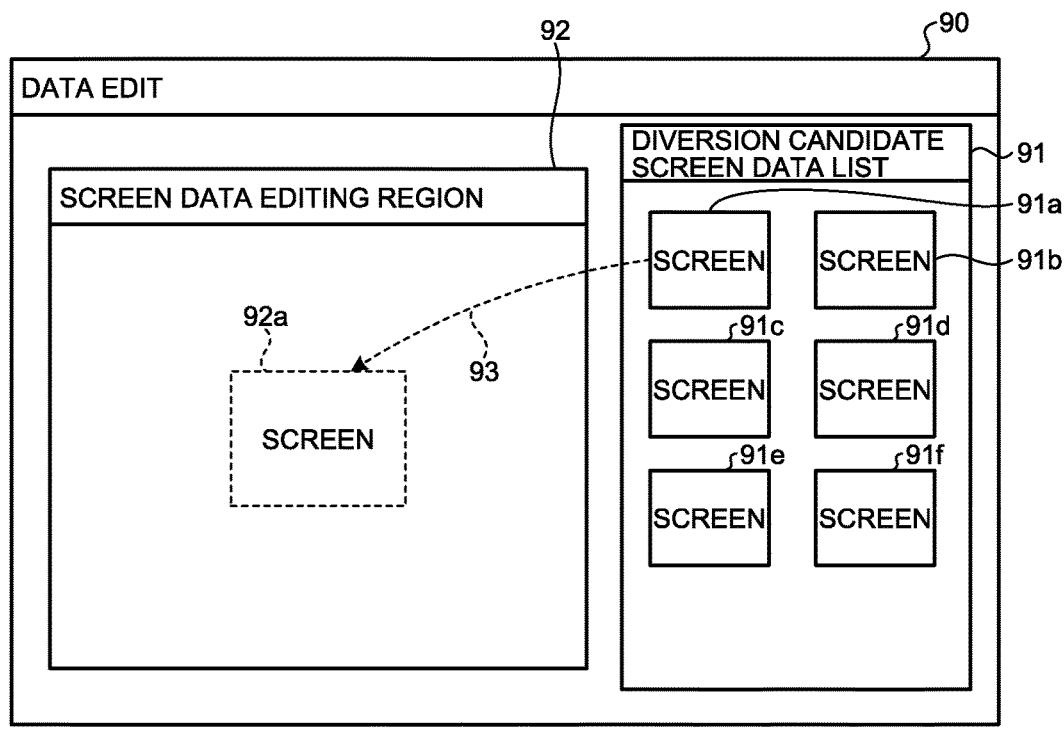
FIG. 8 is an illustration representing an image displayed on the data editing apparatus according to the first embodiment.

FIG. 8 is an illustration representing an image displayed on the data editing apparatus according to the first embodiment. A main window 90 is displayed on the display unit 56. In the main window 90, a sub window 91 for displaying the thumbnail images which are the diversion candidates is displayed. In the sub window 91, a thumbnail image 91a of the screen based on the screen data 61a is displayed. Also in the sub window 91, a thumbnail image 91b of the screen based on the screen data 61b is displayed. Furthermore, in the sub window 91, a thumbnail image 91c of the screen based on the screen data 61c is displayed.

At this time, the temporary screen data creating unit 71 can use a number of pieces of sample image data beforehand stored in the storage unit 54 as diversion candidates, and can display a plurality of thumbnail images 91d, 91e, and 91f based on the number of pieces of sample image data in the sub window 91.

In the first embodiment, the operator operates the input unit 55 and selects the thumbnail image 91a to select the screen data 61a. Then, the operator drags the thumbnail image 91a along a path 93 and drops the thumbnail image 91a at a position 92a in the sub window 92.

Referring again to FIG. 7, in step S102, the temporary screen data creating unit 71 replicates the selected screen data and creates the temporary screen data 65a in the RAM 52. The temporary screen data creating unit 71 may create the temporary screen data 65a in the storage unit 54.

Next, in step S104, the temporary label list creating unit 72 extracts and replicates the allocation information of the label written in the temporary screen data 65a from the first label list 61A by searching the first label list 61A using the label written in the temporary screen data 65a, and creates the temporary label list 65b in the RAM 52. The temporary label list creating unit 72 may create the temporary label list 65b in the storage unit 54.

In the selected screen data 61a, the labels of "device A pressure" and "device A temperature" are written. Therefore, a temporary label list original form creating unit 72a extracts and replicates the first row 61A1 in which the label "device A pressure" is written and the second row 61A2 in which the label "device A temperature" is written from the first label list 61A, so as to create the temporary label list 65b.

The temporary screen data 65a and the temporary label list 65b constitute temporary data 65.

Figure 9:
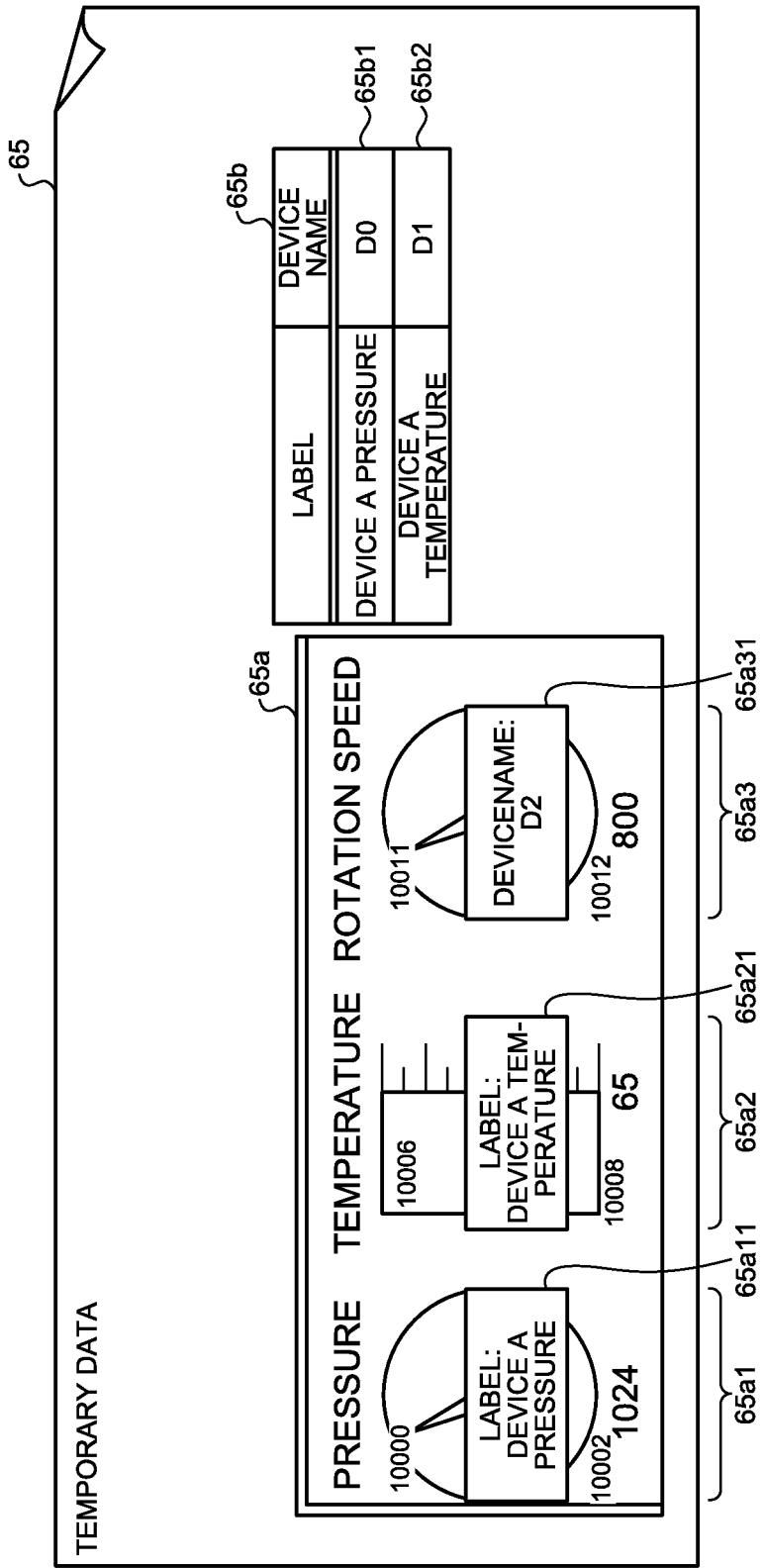
FIG. 9 is a diagram illustrating temporary data according to the first embodiment.

FIG. 9 is a diagram illustrating the temporary data according to the first embodiment. The temporary data 65 include the temporary screen data 65a and the temporary label list 65b. For easy understanding, the temporary screen data 65a are represented herein by images displayed using the description language, not by the description language itself.

At this point of time, the temporary screen data 65a are merely a copy of the screen data 61a, and the temporary label list 65b is merely a copy of a part of the first label list 61A.

The temporary screen data 65a include a first region 65a1, a second region 65a2, and a third region 65a3. In a description region 65a11 in the first region 65a1, a label "device A pressure" is written.

The second region 65a2 is a region for displaying a temperature of an industrial machine referred to as the "device A". In a description region 65a21 in the second region 65a2, a label "device A temperature" is written.

The third region 65a3 is a region for displaying a rotation speed of the industrial machine referred to as the "device A". In a description region 65a31 in the third region 65a3, a device name "D2" is written.

In the item of a label in a first row 65b1 of the temporary label list 65b, "device A pressure" is written. In the item of a device name in the first row 65b1, "D0" is written.

In the item of a label in a second row 65b2 of the temporary label list 65b, "device A temperature" is written. In the item of a device name in the second row 65b2, "D1" is written.

Figure 10:
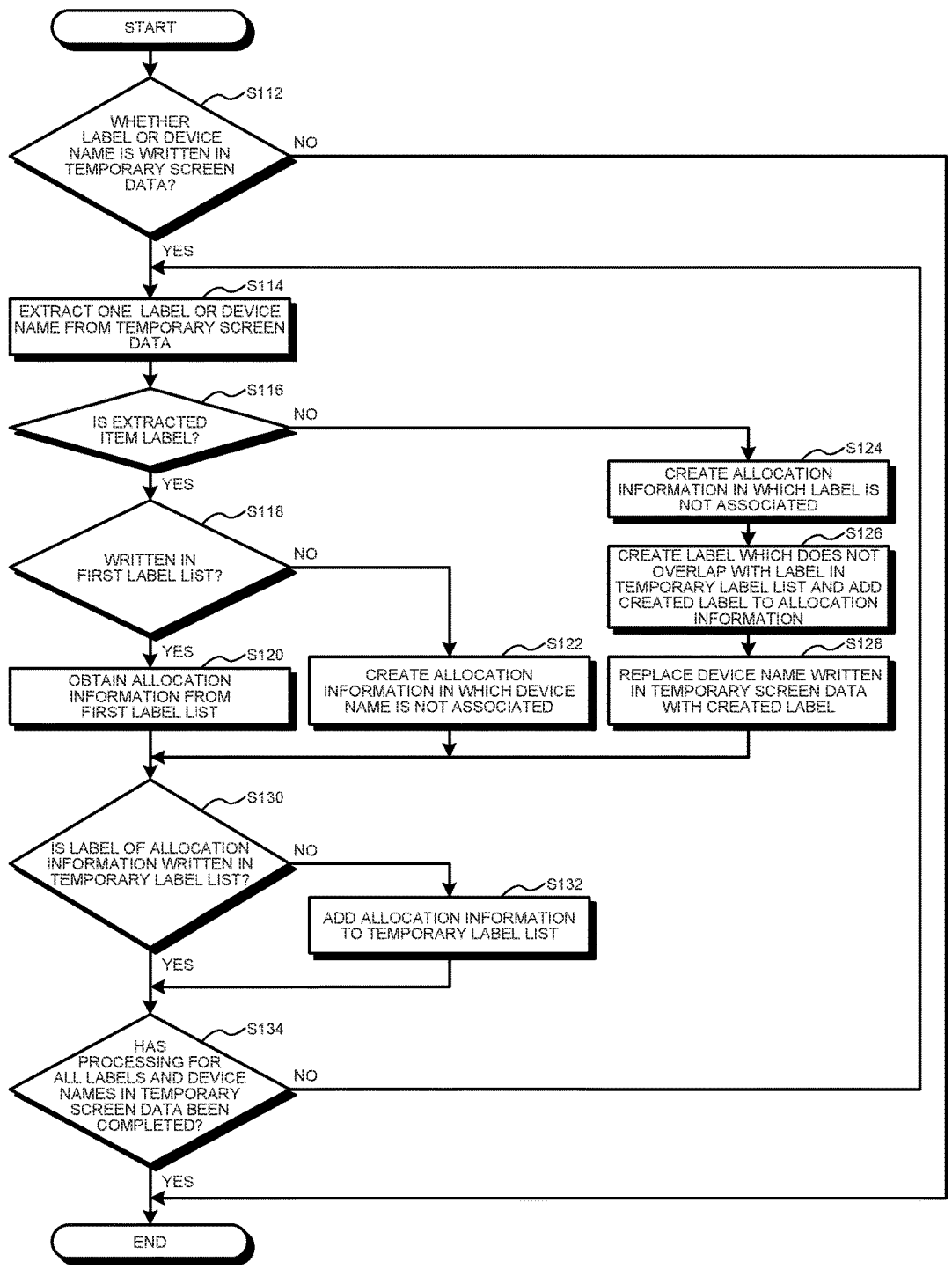
FIG. 10 is a flowchart illustrating temporary label list adding processing of the data editing apparatus according to the first embodiment.

FIG. 10 is a flowchart illustrating temporary label list adding processing of the data editing apparatus according to the first embodiment.

First, the temporary screen data searching unit 73a determines in step S112 whether or not a label or device name is written in the temporary screen data 65a.

When determining in step S112 that the label or device name is not written in the temporary screen data 65a (No), the temporary screen data searching unit 73a terminates the processing. For example, when the selected screen data are sample screen data, there may be a case where the label or device name is not written in the temporary screen data 65a. When the label or device name is not written in the temporary screen data 65a, it is not necessary to perform subsequent processing, so that the temporary screen data searching unit 73a terminates the processing.

On the other hand, when determining in step S112 that the label or device name is written in the temporary screen data 65a (Yes), the temporary screen data searching unit 73a proceeds with the process to step S114.

In step S114, the temporary screen data searching unit 73a extracts one label or device name from the temporary screen data 65a.

Next, the label list searching unit 73b determines in step S116 whether the extracted item is a label or not.

When determining in step S116 that the extracted item is a label (Yes), the label list searching unit 73b proceeds with the process to step S118.

The label list searching unit 73b determines in step S118 whether or not the extracted label is written in the first label list 61A.

When determining in step S118 that the extracted label is written in the first label list 61A (Yes), the label list searching unit 73b proceeds with the process to step S120.

In step S120, the label list searching unit 73b extracts and acquires the allocation information in which the extracted label is written, from the first label list 61A.

On the other hand, when determining in step S118 that the extracted label is not written in the first label list 61A, that is, the extracted label is not associated with the device name (No), the label list searching unit 73b proceeds with the process to step S122.

In step S122, the label list searching unit 73b creates allocation information in which the extracted label is not associated with the device name. That is, the label list searching unit 73b creates allocation information in which the extracted label is written in the item of a label and the item of a device name is blank or null. At this time, the label list searching unit 73b can display a dialog box on the display unit 56 to call attention to the operator or urge the operator to input the device name.

On the other hand, when determining in step S116 that the extracted item is not a label, that is, the extracted item is a device name (No), the label list searching unit 73b proceeds with the process to step S124.

In step S124, the label list searching unit 73b creates allocation information in which the label is not associated with the extracted device name. That is, the label list searching unit 73b creates allocation information in which the item of a label is blank or null and the extracted device name is written in the item of a device name.

Next, in step S126, the label list searching unit 73b creates a label which does not overlap with the label in the temporary label list 65b and adds the created label to the item of a label for the allocation information created in step S124.

Further, in step S128, the label list searching unit 73b replaces the extracted device name written in the temporary screen data 65a with the label created in step S126.

Next, the allocation information adding unit 73c determines in step S130 whether the label of the allocation information obtained in step S120 or the allocation information created in step S122 or step S128 is written in the temporary label list 65b.

When determining in step S130 that the label of the allocation information obtained in step S120 or the allocation information created in step S122 or step S128 is not written in the temporary label list 65b (No), the allocation information adding unit 73c proceeds with the process to step S132.

In step S132, the allocation information adding unit 73c adds the allocation information obtained in step S120 or the allocation information created in step S122 or step S128 to the temporary label list 65b, and proceeds with the process to step S134.

The allocation information adding unit 73c determines in step S134 whether or not the processing for all the labels and the device names in the temporary screen data 65a has been completed.

When determining in step S134 that the processing for all the labels and the device names in the temporary screen data 65a has not been completed, that is, there is an unprocessed label or device name in the temporary screen data 65a (No), the allocation information adding unit 73c proceeds with the process to step S114.

On the other hand, when determining in step S134 that the processing for all the labels and the device names in the temporary screen data 65a has been completed (Yes), the allocation information adding unit 73c terminates the process.

Figure 11:
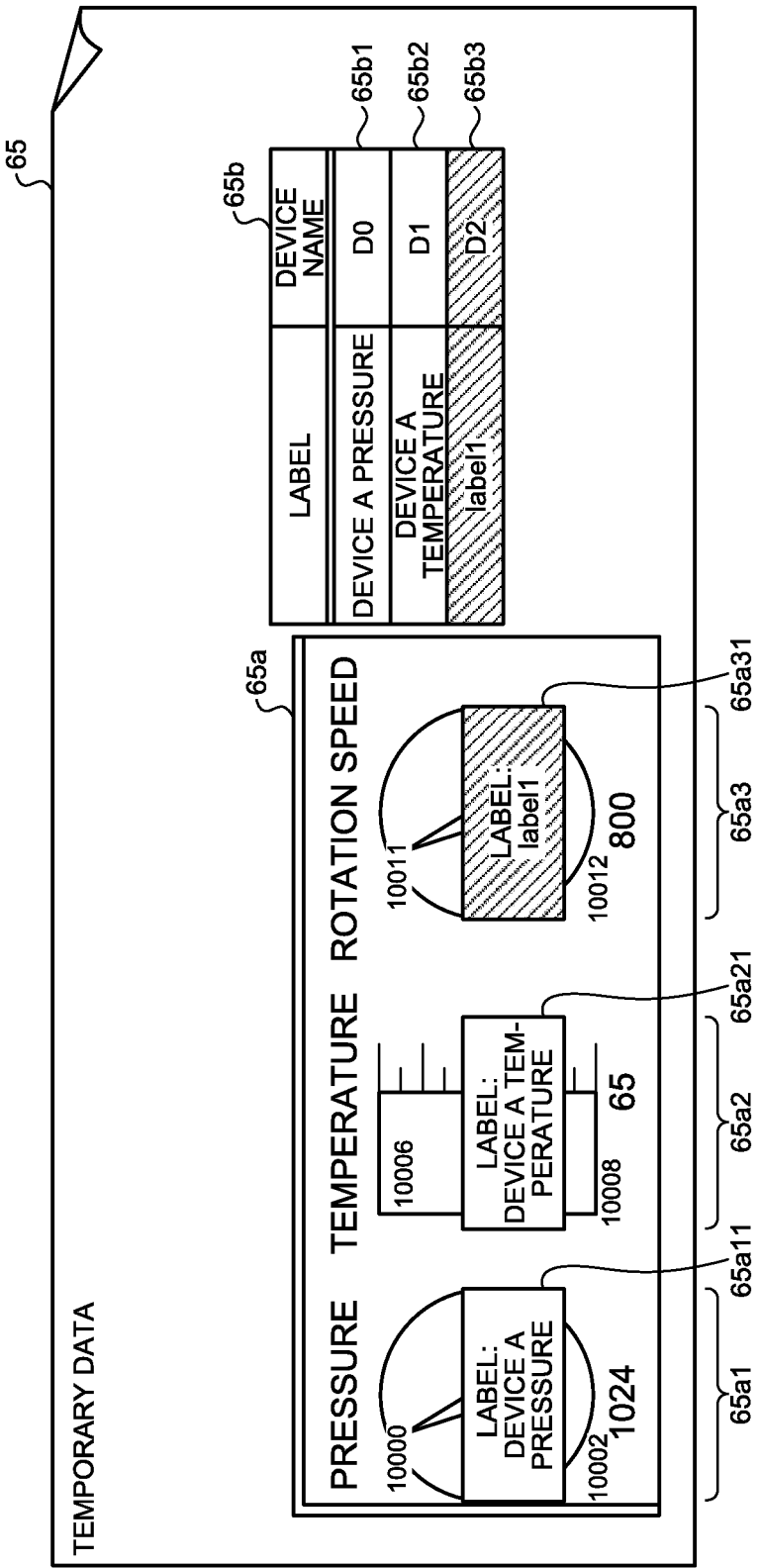
FIG. 11 is a diagram illustrating the temporary data according to the first embodiment.

FIG. 11 is a diagram illustrating the temporary data according to the first embodiment. FIG. 11 is a diagram illustrating the temporary data 65 obtained after the temporary label list adding processing is performed.

As illustrated in FIG. 9 in the above, for the temporary screen data 65a before the temporary label list adding processing is performed, the device name "D2" is written in the description region 65a31. Therefore, the temporary screen data searching unit 73a extracts the device name "D2" in step S114. The label list searching unit 73b determines in step S116 that the extracted item is a device name. Then, in step S124, the label list searching unit 73b creates allocation information in which the extracted device name "D2" is not associated with a label. That is, the label list searching unit 73b creates the allocation information in which the item of a label is blank or null and "D2" is written in the item of a device name.

Next, in step S126, the label list searching unit 73b creates a label which does not overlap with the label in the temporary label list 65b and adds the created label to the item of a label for the allocation information created in step S124. For example, the label list searching unit 73b can create a label which has a character string "label" and a number added thereto on an end of the character string. Here, the label list searching unit 73b creates a label represented by "label1".

In addition, in step S128, the label list searching unit 73b replaces the device name "D2" written in the temporary screen data 65a with the label "label1" created in step S126.

Next, the allocation information adding unit 73c determines in step S130 whether or not the label "label1" of the allocation information created in step S128 is written in the temporary label list 65b.

The allocation information adding unit 73c determines in step S130 that the label "label1" of the allocation information created in step S128 is not written in the temporary label list 65b (No), and it proceeds with the process to step S132.

In step S132, the allocation information adding unit 73c adds the allocation information created in step S128 to the temporary label list 65b.

As a result of the above processing having been executed, as illustrated in FIG. 11, the label "label1" is written in the description region 65a31 of the temporary screen data 65a. In addition, in the temporary label list 65b, "label1" is written in the item of a label, and a third row 65b3 that serves as allocation information in which "D2" is written in the item of a device name is added.

Figure 12:
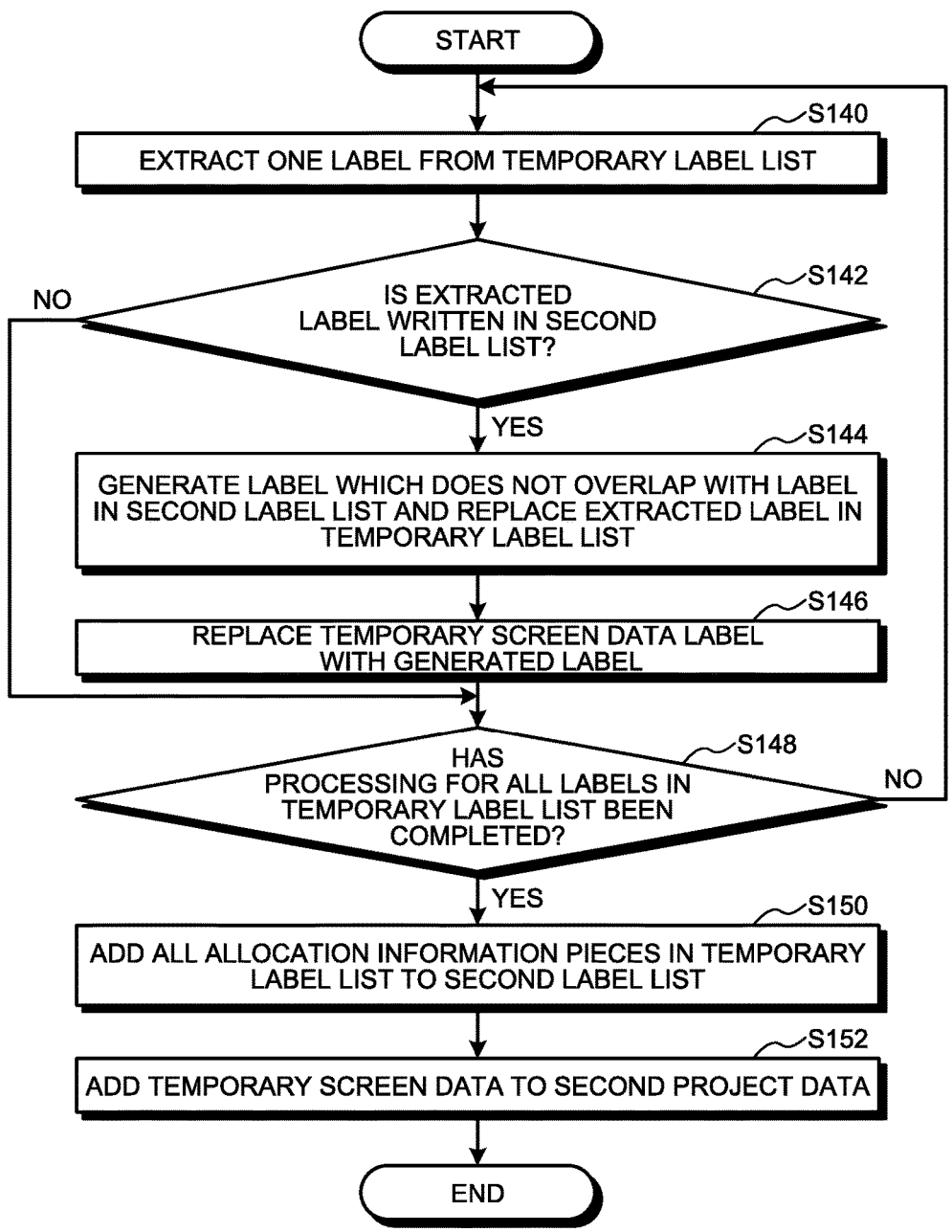
FIG. 12 is a flowchart illustrating temporary data changing processing of the data editing apparatus according to the first embodiment.

FIG. 12 is a flowchart illustrating temporary data changing processing of the data editing apparatus according to the first embodiment.

First, in step S140, the temporary label list changing unit 74a extracts one label from the temporary label list 65b.

Next, the temporary label list changing unit 74a determines in step S142 whether or not the extracted label is written in the second label list 62B.

When determining in step S142 that the extracted label is not written in the second label list 62B, that is, the extracted label does not overlap with the label written in the second label list 62B (No), the temporary label list changing unit 74a proceeds with the process to step S148.

On the other hand, when determining in step S142 that the extracted label is written in the second label list 62B, that is, the extracted label overlaps with the label written in the second label list 62B (Yes), the temporary label list changing unit 74a proceeds with the process to step S144.

In step S144, the temporary label list changing unit 74a generates a label which does not overlap with the label written in the second label list 62B and replaces the extracted label in the temporary label list 65b with the generated label. The temporary label list changing unit 74a may display a dialog box on the display unit 56 to urge the operator to input a label.

Next, in step S146, the temporary screen data changing unit 74b replaces the label identical to the extracted label with the label generated in step S144 in the temporary screen data 65a.

Next, the temporary label list changing unit 74a determines in step S148 whether or not the processing for all the labels in the temporary label list 65b has been completed.

When determining in step S148 that the processing for all the labels in the temporary label list 65b has not been completed, that is, there is an unprocessed label in the temporary label list 65b (No), the temporary label list changing unit 74a proceeds with the process to step S140.

On the other hand, when determining in step S148 that the processing for all the labels in the temporary label list 65b has been completed (Yes), the temporary label list changing unit 74a proceeds with the process to step S150.

In step S150, the project data adding unit 75 adds all allocation information pieces in the temporary label list 65b to the second label list 62B.

Next, in step S152, the project data adding unit 75 adds the temporary screen data 65a to the second project data 62, and terminates the processing.

Figure 13:
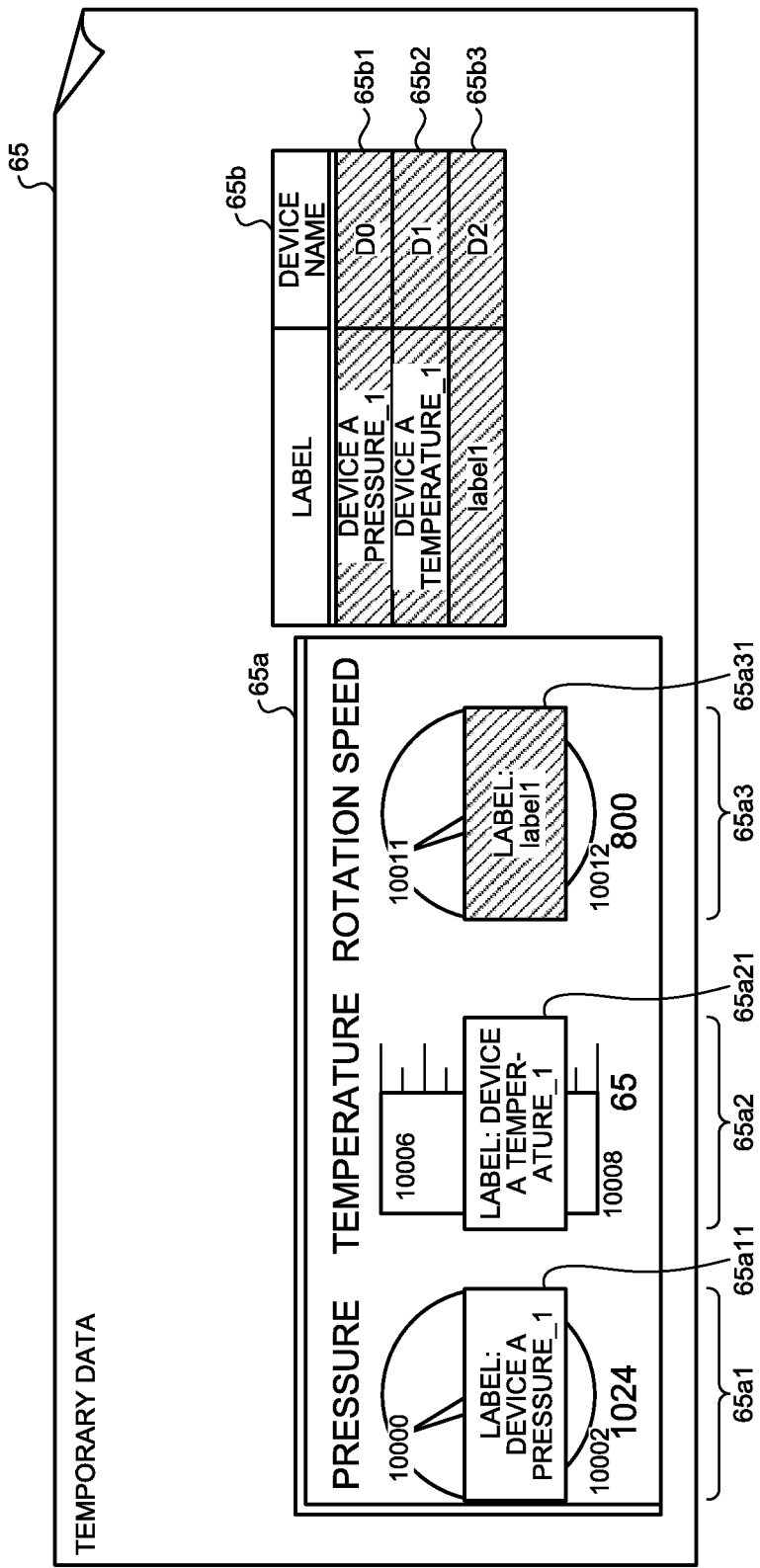
FIG. 13 is a diagram illustrating the temporary data according to the first embodiment.

FIG. 13 is a diagram illustrating temporary data according to the first embodiment. FIG. 13 is a diagram illustrating the temporary data 65 obtained after the temporary data changing processing is performed.

The temporary data 65 before the temporary data changing processing illustrated in FIG. 11 in the above is performed is compared with the second project data 62 illustrated in FIG. 6. In the first row 65b1 of the temporary label list 65b, there is described the allocation information in which the label "device A pressure" is associated with the device name "D0". On the other hand, in the first row 62B1 of the second label list 62B, the allocation information in which the label "device A pressure" is associated with the device name "D5" is written. Therefore, the label "device A pressure" is associated with two different device names and overlaps.

It is contemplated that this situation may occur, for example, when real-time pressure data of the device A are stored for the device name "D0" and pressure data of the device A at the peak time are stored for the device name "D5".

Therefore, in step S144, the temporary label list changing unit 74a generates a label which does not overlap with the label "device A pressure" written in the second label list 62B and replaces the extracted label "device A pressure" in the temporary label list 65b with the generated label. For example, the temporary label list changing unit 74a can create a label having the extracted label "device A pressure" with "_" and a number added thereto on an end of the label. Here, the temporary label list changing unit 74a creates a label "device A pressure_1".

Besides, in step S146, the temporary screen data changing unit 74b replaces the label "device A pressure" written in the description region 65a11 with the label "device A pressure_1" generated in step S144, in the temporary screen data 65a.

Furthermore, in the second row 65b2 of the temporary label list 65b, there is described the allocation information in which the label "device A temperature" is associated with the device name "D1". On the other hand, in the second row 62B2 of the second label list 62B, the allocation information in which the label "device A temperature" is associated with the device name "D6" is written. Therefore, the label "device A temperature" is associated with two different device names and overlaps.

It is contemplated that this situation may occur, for example, when real-time temperature data of the device A are stored for the device name "D1" and temperature data of the device A at the peak time are stored for the device name "D6".

Therefore, in step S144, the temporary label list changing unit 74a generates a label which does not overlap with the label "device A temperature" written in the second label list 62B and replaces the extracted label "device A temperature" in the temporary label list 65b with the generated label. For example, the temporary label list changing unit 74a can create a label having the extracted label "device A temperature" with "_" and a number added thereto on an end of the label. Here, the temporary label list changing unit 74a creates a label "device A temperature_1".

Also, in step S146, the temporary screen data changing unit 74b replaces the label "device A temperature" written in the description region 65a21 in the temporary screen data 65a with the label "device A temperature_1" generated in step S144, in the temporary screen data 65a.

FIG. 14 is a diagram illustrating the second project data according to the first embodiment. The project data adding unit 75 adds the temporary screen data 65a illustrated in FIG. 13 to the second project data 62 as screen data 62a'. Also, the project data adding unit 75 adds the allocation information written in the rows 65b1, 65b2, and 65b3 of the temporary label list 65b illustrated in FIG. 13 to the second label list 62B. In FIG. 14, the third row 62B3 of the second label list 62B corresponds to the first row 65b1 of the temporary label list 65b. A fourth row 62B4 of the second label list 62B corresponds to the second row 65b2 of the temporary label list 65b. A fifth row 62B5 of the second label list 62B corresponds to the third row 65b3 of the temporary label list 65b.

The second project data 62 is transferred to the programmable display 4 as it is or after the data 62 are compiled into a binary format.

As described above, when the label written in the temporary screen data 65a and the temporary label list 65b is written in the second label list 62B, the data editing apparatus 5 replaces the label written in the temporary screen data 65a and the temporary label list 65b with a label which does not overlap with the label written in the second label list 62B.

By so doing, the data editing apparatus 5 can reduce the necessity for the operator to compare the screen data 62a' with the second label list 62B so as to check the overlap of the labels. As a result, the data editing apparatus 5 can reduce human errors of the operator, a workload of the operator, a work time of the operator, and a work cost of the operator. Therefore, the data editing apparatus 5 can easily divert the screen data 61a to the second project data 62.

When the label or device name written in the temporary screen data 65a is not written in the temporary label list 65b, the data editing apparatus 5 creates allocation information including the label or device name which has not been written in the temporary label list 65b and adds the allocation information to the temporary label list 65b.

By doing so, when the label or device name written in the screen data 61a is not written in the first label list 61A, the data editing apparatus 5 can reduce necessity for the operator to compare the screen data 62a' with the second label list 62B so as to check an erroneous omission of the label or device name in the second label list 62B. As a result, the data editing apparatus 5 can reduce human errors of the operator, a workload of the operator, a work time of the operator, and a work cost of the operator. Therefore, the data editing apparatus 5 can facilitated diverting the screen data 61a to the second project data 62.

Also, when a device name written in the temporary screen data 65a is not written in the temporary label list 65b, the data editing apparatus 5 can eliminate the need for an operation of the operator to associate a label with the device name written in the screen data 61a, replace the device name written in the screen data 61a with the label, and add the allocation information for associating the label with the device name to the second label list 62B. In other words, the data editing apparatus 5 can modify the screen data 61a that are not described using a label to the screen data 62a' that are described using a label. By so doing, the data editing apparatus 5 can improve the readability of the screen data 62a'. As a result, the data editing apparatus 5 can reduce human errors of the operator, a workload of the operator, a work time of the operator, and a work cost of the operator. Consequently, the data editing apparatus 5 can facilitate diverting the screen data 61a to the second project data 62.

In addition, when the label written in the temporary screen data 65a is not written in the temporary label list 65b, the data editing apparatus 5 can eliminate the need for an operation for the operator to add the allocation information including the label written in the screen data 61a to the second label list 62B. At this time, the data editing apparatus 5 can display a dialog box on the display unit 56 to call attention to the operator and/or urge the operator to input the device name. As a result, the data editing apparatus 5 can reduce human errors of the operator, a workload of the operator, a work time of the operator, and a work cost of the operator. Therefore, the data editing apparatus 5 can easily divert the screen data 61a to the second project data 62.

The configurations illustrated in the above embodiment show one example of contents of the present invention, and can be combined with other publicly known techniques and partially omitted or modified without departing from the scope of the present invention.

REFERENCE SIGNS LIST 1 control system; 2 PLC; 4 programmable display; 5 data editing apparatus; 51 CPU; 52 RAM; 54 storage unit; 61 first project data; 61A first label list; 61a, 61b, 61c, 62a', 62d, 62e screen data; 62 second project data; 62B second label list; 65 temporary data; 65a temporary screen data; 65b temporary label list; 71 temporary screen data creating unit; 72 temporary label list creating unit; 73 temporary label list adding unit; 73a temporary screen data searching unit; 73b label list searching unit; 73c allocation information adding unit; 74 temporary data changing unit; 74a temporary label list changing unit; 74b temporary screen data changing unit; 75 project data adding unit.

The invention claimed is:

1. A data editing apparatus comprising:
a storage unit configured to store:
first project data including:
a first group of screen data; and
a first label list having written therein allocation information for associating a label and a device name written in the first group of screen data with each other, and
second project data including:
a second group of screen data; and
a second label list having written therein allocation information for associating a label and a device name written in the second group of screen data with each other;
a temporary screen data creating unit configured to create temporary screen data based on screen data selected from among the first group of screen data;
a temporary label list creating unit configured to create a temporary label list based on allocation information in the first label list including a label written in the temporary screen data;
a temporary data changing unit configured to, in response to determining that a label written in the temporary screen data and the temporary label list, which is to be written in the second label list, is identical to a label written in the second label list, replace the label written in the temporary screen data and the temporary label list with a label that is not identical to the label written in the second label list, to thereby generate changed temporary screen data and a changed temporary label list; and
a project data adding unit configured to add the changed temporary screen data to the second project data, and to add allocation information written in the changed temporary label list to the second label list.

2. The data editing apparatus according to claim 1, wherein
the temporary data changing unit includes:
a temporary label list changing unit configured to replace the label written in the temporary label list with the label that is not identical to the label written in the second label list when the label written in the temporary label list is written in the second label list; and
a temporary screen data changing unit configured to replace the label to be changed by the temporary label list changing unit with the label changed by the temporary label list changing unit, in the temporary screen data.

3. The data editing apparatus according to claim 1, further comprising:
a temporary label list adding unit configured to, when a label or device name written in the temporary screen data is not written in the temporary label list, create allocation information including the label or device name that has not been written in the temporary label list and add the allocation information to the temporary label list.

4. The data editing apparatus according to claim 3, wherein
the temporary label list adding unit includes:
a temporary screen data searching unit configured to search for and extract a label written in the temporary screen data;

a label list searching unit configured to search the first label list using the label extracted by the temporary screen data searching unit and thereby generate search results; and an allocation information adding unit configured to create allocation information representing that the label extracted by the temporary screen data searching unit is not associated with a device name, and add the allocation information to the temporary label list, in response to the search results indicating that allocation information including the label extracted by the temporary screen data searching unit is not written in the first label list.

5. The data editing apparatus according to claim 4, wherein the temporary screen data searching unit is further configured to search for and extract a device name written in selected screen data, and the allocation information adding unit is further configured to create a label that is not identical to the label written in the temporary label list and create allocation information for associating the device name extracted by the temporary screen data searching unit with the created label to add the allocation information to the temporary label list, and replace the extracted device name written in the temporary screen data with the created label.

6. A data editing method comprising:

a temporary screen data creating step of creating temporary screen data based on screen data selected from among a first group of screen data in first project data including the first group of screen data and a first label list having written therein allocation information for associating a label and a device name written in the first group of screen data with each other;

a temporary label list creating step of creating a temporary label list based on the allocation information in the first label list including a label written in the selected screen data;

a temporary data changing step of, in response to determining that a label written in the temporary screen data and the temporary label list, which is to be written in a second label list in second project data including a second group of screen data and the second label list having written therein allocation information for associating a label and a device name written in the second group of screen data with each other, is identical to a label written in the second label list, replacing the label written in the temporary screen data and the temporary label list with a label that is not identical to the label written in the second label list, to thereby generate changed temporary screen data and a changed temporary label list; and a project data adding step of adding the changed temporary screen data to the second project data and adding allocation information written in the changed temporary label list to the second label list.

7. A non-transitory computer readable storage medium having instructions stored thereon which, when executed by a computer, cause the computer to execute:

a temporary screen data creating step of creating temporary screen data based on screen data selected from among a first group of screen data in first project data including the first group of screen data and a first label list having written therein allocation information for associating a label and a device name written in the first group of screen data with each other;

a temporary label list creating step of creating a temporary label list based on the allocation information in the first label list including a label written in the selected screen data;

a temporary data changing step of, in response to determining that a label written in the temporary screen data and the temporary label list, which is to be written in a second label list in second project data including a second group of screen data and the second label list having written therein allocation information for associating a label and a device name written in the second group of screen data with each other, is identical to a label written in the second label list, replacing the label written in the temporary screen data and the temporary label list with a label that is not identical to the label written in the second label list, to thereby generate changed temporary screen data and a changed temporary label list; and a project data adding step of adding the changed temporary screen data to the second project data and adding allocation information written in the changed temporary label list to the second label list.

* * * * *